United States Patent
Gash et al.

(10) Patent No.: US 7,211,607 B2
(45) Date of Patent: *May 1, 2007

(54) METHOD FOR PRODUCING HIGH SURFACE AREA CHROMIA MATERIALS FOR CATALYSIS

(75) Inventors: Alexander E. Gash, Brentwood, CA (US); Joe Satcher, Patterson, CA (US); Thomas Tillotson, Tracy, CA (US); Lawrence Hrubesh, Pleasanton, CA (US); Randall Simpson, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/132,803

(22) Filed: Apr. 24, 2002

(65) Prior Publication Data

US 2003/0202933 A1 Oct. 30, 2003

(51) Int. Cl.
*C01G 37/00* (2006.01)

(52) U.S. Cl. .......................... 521/61; 521/64; 521/181; 524/430; 423/596; 423/607; 502/300; 502/319

(58) Field of Classification Search ................ 521/181, 521/61, 64; 423/596, 607; 502/300, 319; 524/430; 149/19.92
See application file for complete search history.

(56) References Cited

U.S. PATENT DOCUMENTS

| 4,619,908 | A | | 10/1986 | Cheng et al. |
|---|---|---|---|---|
| 4,717,708 | A | | 1/1988 | Cheng et al. |
| 5,855,899 | A | * | 1/1999 | Batts et al. |
| 6,123,954 | A | * | 9/2000 | Batts et al. |
| 6,361,666 | B1 | * | 3/2002 | Lipinski et al. |
| 6,593,655 | B1 | * | 7/2003 | Petricivic et al. |
| 6,986,818 | B2 | * | 1/2006 | Tillotson et al. ......... 149/19.92 |

FOREIGN PATENT DOCUMENTS

WO    WO01/94276 A2    5/2002

OTHER PUBLICATIONS

Gash et a.l, "New sol-gel Synthetic Route to Transition and main-group Metal Oxide Aerogels Using Inorganic Salts Precursors", J. Non-Cryst. Solids, vol. 285, pp. 22-28.*

Skapin et al., "Fluorination effects in Chroma Aerogels and Xerogels", J. Non-Cryst. Solids, vol. 225, pp. 163-167.*

* cited by examiner

*Primary Examiner*—Irina S. Zemel
(74) *Attorney, Agent, or Firm*—Alan H. Thompson; Ann M. Lee; John H. Lee

(57) ABSTRACT

Nanostructured chromium(III)-oxide-based materials using sol-gel processing and a synthetic route for producing such materials are disclosed herein. Monolithic aerogels and xerogels having surface areas between 150 $m^2/g$ and 520 $m^2/g$ have been produced. The synthetic method employs the use of stable and inexpensive hydrated-chromium(III) inorganic salts and common solvents such as water, ethanol, methanol, 1-propanol, t-butanol, 2-ethoxy ethanol, and ethylene glycol, DMSO, and dimethyl formamide. The synthesis involves the dissolution of the metal salt in a solvent followed by an addition of a proton scavenger, such as an epoxide, which induces gel formation in a timely manner. Both critical point (supercritical extraction) and atmospheric (low temperature evaporation) drying may be employed to produce monolithic aerogels and xerogels, respectively.

19 Claims, 2 Drawing Sheets

METHOD FOR PRODUCING HIGH SURFACE AREA CHROMIA MATERIALS FOR CATALYSIS

The United States Government has rights in this invention pursuant to Contract No. W-7405-ENG-48 between the United States Department of Energy and the University of California for the operation of Lawrence Livermore National Laboratory.

BACKGROUND OF THE INVENTION

Pure and supported chromia catalysts are used for a variety of catalytic transformations. High surface area is an important characteristic of these materials. High surface area chromia-based materials are used as catalysts for halogenations of hydrocarbons (especially fluorinations), the dehydration of alcohols, the dehydrogenation of alkanes and olefins, and isomerization reactions. Presently, high surface area chromia is made through the reduction of $CrO_3$ with methanol under high temperature supercritical methanol conditions (~300° C.). This method is dangerous because of the extreme conditions for synthesis and the mixing of a powerful reducing agent, e.g., $CrO_3$, with methanol. It is also very expensive due to the equipment needed to execute the supercritical extraction. Thus, a need exists for a method for producing high surface area chromia catalysts, which does not use a dangerous mixture of chemicals nor utilize a very high temperature supercritical extraction process.

Aerogel and xerogel materials containing high surface area chromia can be produced using sol-gel chemistry methods. Sol-gel chemistry is an attractive alternative to other synthetic methods for many reasons. The method is low temperature, low cost, and can generally be done under ambient conditions with general lab equipment, all of which make processing convenient and inexpensive. Historically, the sol-gel method has employed the use of metal alkoxide precursors that readily undergo catalyzed hydrolysis and condensation to form a sol of metal oxide particles with nanoscale dimensions (1–100 nm).

Skapin et al, J. Non-Cryst. Solids 1998, 225, 163 and Armor et al. J. Appl. Catal. 1985, 19, 327 report on a synthetic method to prepare chromia aerogel powders. An aqueous suspension of $CrO_3$ is added to methanol, followed by supercritical processing to chemically reduce the Cr(IV) to Cr(III) and form chromia. Surface areas of the chromia aerogels reported by Skapin et al were 300–550 $m^2/g$ and Armor et al were 500–700 $m^2/g$. Chromium trioxide is a powerful reducing agent and great care must be taken to avoid a violent reaction with alcohol. The high temperature and pressures of this process require the use of expensive and sophisticated processing equipment. This fact coupled with the dangerous nature of the precursor solutions, that require extreme safety precautions, likely precludes the widespread application of this method.

With the particular exceptions of titanium and zirconium, alkoxide-transition metal precursors are not readily available. In the absence of the alkoxides, researchers have used more traditional approaches for the successful sol-gel preparation of transition metal oxides. These approaches typically involve aqueous precipitation of the metal ion with base, extensive washing and solvent exchange of the products and atmospheric or supercritical drying. For example, vibrant chromia (the generic term for hydrated chromic oxide of unknown hydration) gels have been prepared by such methods. These methods have been clearly summarized by Livage et al., *Prog. Inorg. Chem.*, 18, 259 (1988).

SUMMARY OF THE INVENTION

Aspects of the invention include a sol-gel processing method for producing nanostructured chromium(III)-oxide-based materials comprising: forming a solution containing at least one hydrated-chromium(III) inorganic salt and at least one solvent, wherein the solution has a pH less than 7 and a gelation point; adjusting the pH of the solution with a first proton scavenger to a point just prior to the gelation point; and adding an organic epoxide to the solution to induce gel formation of the solution, wherein following the addition a nanostructured chromium(III)-oxide-based gel is formed.

Further aspects of the invention include a sol-gel processing method for producing nanostructured chromium(III)-oxide-based materials comprising: forming a solution containing at least one anhydrous chromium(III) inorganic salt and at least one solvent; adding at least 3 equivalents of water to the solution causing the solution to have a pH less than 7 and a gelation point; adjusting the pH of the solution with a proton scavenger to a point just prior to the gelation point; and adding an organic epoxide to the solution to induce gel formation of the solution, wherein following the addition a nanostructured chromium(III)-oxide-based gel is formed.

DETAILED DESCRIPTION OF THE INVENTION

Figure 1:
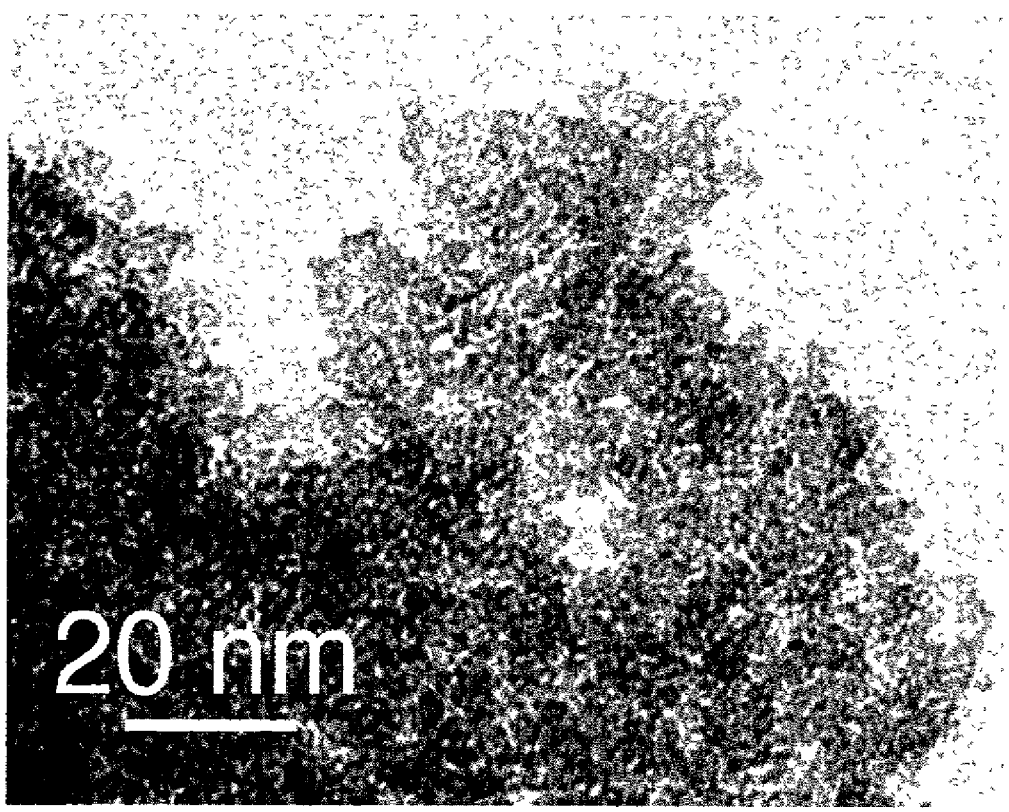
FIG. 1 is a high resolution transmission electron micrograph of a chromia aerogel.
Figure 2:
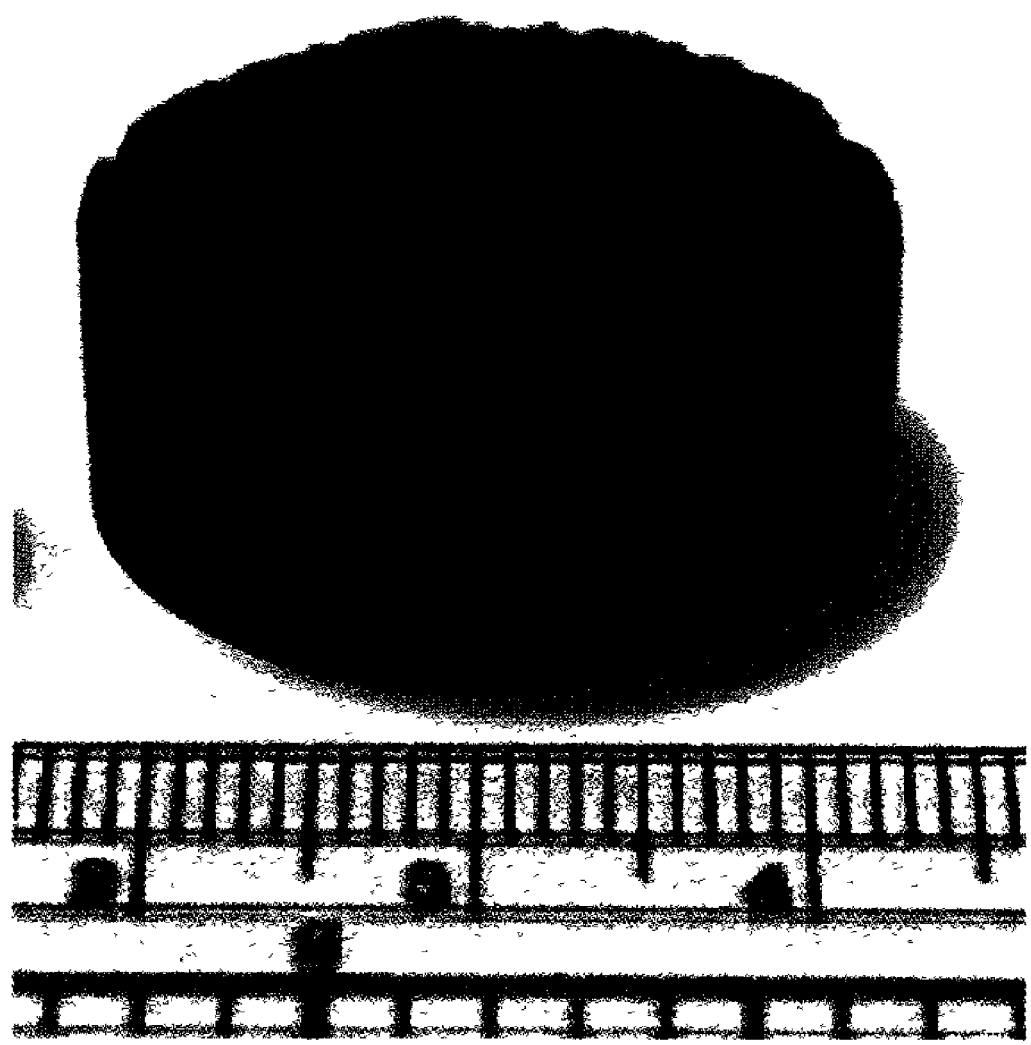
FIG. 2 is a photo of a chromia aerosel monolith with a density of 200 ms/ml. The scale of the ruler in the photo is in cm.

Propylene oxide has been previously used as a gelation promoter in the sol-gel synthesis of lanthanide and lanthanide-silicate gels using hydrated lanthanide nitrate salts in a report by Tillotson et al., *J. Sol-Gel Sci. Technol*, vol. 1, pg. 241, (1994). Itoh et al. in Ceram. *Soc. Jpn*, vol. 101, pp.1081–1083 (1993), has reported the use of propylene oxide in the sol-gel preparation of-silicate-aluminate gels using hydrated aluminum chloride as the Al source. Also reported is the use of this synthetic route to make porous $Fe_2O_3$ solids. See A. E. Gash et al. *Chem. Mater.*, vol. 13, pg. 999 (2001) and U.S. patent application Ser. No. 09/586,426, filed Jun. 2, 2000, entitled "Method for Producing Nanostructured Metal Oxides", assigned to the same assignee and incorporated herein by reference.

Disclosed herein are high surface area chromia(nominally chromium(III)oxide) materials and a method for producing such materials. High surface area chromia-based materials are useful in catalyzing halogenations of hydrocarbons (especially fluorinations, including the fluorination of chlorofluorocarbon materials [CFCs]), the dehydration of alcohol, the dehydrogenation of alkanes and olefins, and isomerization reactions, and a method for producing such materials are disclosed herein. The method disclosed is a synthetic route for producing high-surface area chromium(III)-oxide-based materials using sol-gel processing.

Typically high-surface area is meant to describe materials with surface areas of greater than 50 $m^2/g$. The method employs the use of stable and inexpensive hydrated-chromium(III) inorganic salts, common solvents, and organic epoxides. Common solvents are those typically used in large quantities by the chemical industry, e.g., dimethyl formamide (DMF), tetrahydrofuran (THF), dimethyl sulfoxide (DMSO), formamide. Preferred common solvents are those that are non-halogenated and non-toxic or have low toxicities, and are generally considered non-hazardous relative to other available solvents. Examples include water, ethanol, methanol, 1-propanol, t-butanol, 2-ethoxy ethanol, and ethylene glycol, DMSO, and dimethyl formamide. An epoxide is defined as an organic compound containing a reactive group resulting from the union of an oxygen atom and two carbon atoms that are joined together either directly or indirectly through a third carbon atom (see diagram below) where n=0 or 1 and $R_{1-4}$ are identical or different atoms or functional groups (e.g., H, or $CH_3$).

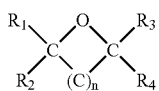

Inorganic chromium (III) salts are those that consist of the $Cr^{3+}$ cationic species and can contain anions of any element except that of a pure hydrocarbon.

With the addition of epoxide(s), solutions of these salts undergo hydrolysis and condensation reactions to form an inorganic glassy chromia polymer gel. The inorganic glassy chromia polymer term refers to an inorganic compound which has bonds linking the atoms into a network that does not contain carbon atoms in the network. The term glassy refers to a solid that is non-crystalline. The term gel refers to a colloid in which the solid phase has linked together to form a 3-dimensional structure that spans the volume of the container that it is in and contains the liquid solvent in the interstices.

The synthetic method involves the dissolution of the metal salt in a solvent followed by the addition of a proton scavenger, e.g., an organic epoxide, which induces gel formation within varying amounts of time (anywhere from seconds to hours to days depending on experimental conditions). Herein after a proton scavenger is any chemical species capable of binding to a proton. The gel is then dried by either low temperature critical point drying (supercritical extraction) to produce monolithic or powdered aerogels or by atmospheric drying (low temperature evaporation) to produce monolithic or powdered xerogels.

The results of several analytical tests show that the inorganic chromia polymer materials produced by this method are porous, contain high surface areas, and produce durable monoliths. Transmission electron microscopy was used to characterize the size, morphology, and crystallinity of the particles and the size and morphology of the pores that make up the materials produced by this method. Gas adsorption/desorption methods and theory are used to determine the specific surface area, average pore size, and pore volume of these materials. Thermal methods, i.e., differential scanning calorimetry (DSC) and thermal gravimetric analysis (TGA) were also used to determine the amounts of adsorbed species on these materials as well as temperatures at which crystalline transformations take place. Infra red-spectroscopy was used to determine the nature of adsorbed species on these materials.

Based on the tests conducted, it is believed that the presence of a significant amount of water is necessary for the formation of the $[Cr(H_2O)_6]^{3+}$ species that is the solution phase precursor to these solid chromia-based materials. The necessary water can be added to the solution before addition of the epoxide or can be present in the inorganic salt used in the syntheses as waters of hydration.

Two processing operations are employed: 1) the preparation of chromia gels from Cr(III) salts, and 2) the preparation of chromia aerogels and/or xerogels from the chromia gels. Each operation is described hereinafter separately.

Preparation of Chromia Gels from Cr(III) Salts:

Chromium(III) nitrate nonahydrate $Cr(NO_3)_3.9H_2O$, produced by Aldrich, and chromium(III) chloride hexahydrate, $CrCl_3.6H_2O$, produced by Aldrich, and propylene oxide (99%), produced by Aldrich, were used as received. All solvents used were reagent grade or better and the $H_2O$ used was distilled. All synthesis were performed under ambient conditions.

In a typical experiment that produced a high surface area chromia gel, about 0.65 g of $Cr(NO_3)_3.9H_2O$ (about 1.6 mmol) was dissolved in about 2.5 ml of 200 proof ethanol to give a clear dark blue solution that remained unchanged upon storage, under ambient conditions, for several months. It has been observed that solutions that are above about 0.03 M in Cr(III) salt up to the solubility limit of the Cr(III) salt in a particular solvent comprise the useful range of these materials. Below about 0.03 M synthetic attempts result in very long gel times that are not practical, e.g., years, or samples that do not gel at all. Adding about a 1.0 g portion of propylene oxide (about 17 mmol) to the dark blue solution induced the formation of a dark blue transparent gel within a few hours under ambient conditions. One synthetic parameter that can be varied and still produce gels is the ratio of propylene oxide to Cr(III). Experiments were run where that ratio was varied from 3–25. The rate of gel formation was observed to increase with this ratio. These experiments also indicated that there is a critical ratio below which no gel formation is observed even after several months. That minimum value is 6 for the synthetic conditions described here ([Cr]=0.35 M; $H_2O/Cr$=9; solvent=ethanol). However, it is not necessary that all 6 equivalents of propylene oxide be delivered at one time. Gels can be formed under these conditions by the addition of any number of aliquots of epoxide as long as the sum total of equivalents is greater than or equal to six.

Details such as a description of the preparation of chromia gels, the processing of the chromia gels, and the characterization of the aerogels produced from the chromia gels are contained in A. E. Gash et al, "New Sol-Gel Synthetic Route to Transition and Main-Group Metal Oxide Aerogels Using Inorganic Salt Precursors", J. Non-Cryst. Solids, vol. 22, pg. 285 (2001) which is hereby incorporated by reference.

A summary of the various synthetic conditions used to prepare dark blue chromia gels is shown in Table 1, wherein, the chromia gels comprised (Cr=0.35M, propylene oxide/Fe=11) and ppt=precipitation of dense solid:

TABLE 1

| Precursor Salt | solvent | $t_{gel}$ (hours) |
|---|---|---|
| $Cr(NO_3)_3.9H_2O$ | methanol | 14 |
| $Cr(NO_3)_3.9H_2O$ | ethanol | 3.1 |
| $Cr(NO_3)_3.9H_2O$ | 1-propanol | 2.6 |
| $Cr(NO_3)_3.9H_2O$ | t-butanol | 1.3 |
| $Cr(NO_3)_3.9H_2O$ | 2-ethoxy ethanol | 2 |
| $Cr(NO_3)_3.9H_2O$ | DMF | 20 |
| $Cr(NO_3)_3.9H_2O$ | formamide | no gel |
| $Cr(NO_3)_3.9H_2O$ | DMSO | 72 |
| $Cr(NO_3)_3.9H_2O$ | ethylene glycol | ~240 |
| $Cr(NO_3)_3.9H_2O$ | water | no gel |

TABLE 1-continued

| Precursor Salt | solvent | $t_{gel}$ (hours) |
|---|---|---|
| $Cr(NO_3)_3 \cdot 9H_2O$ | THF | ppt. |
| $CrCl_3 \cdot 6H_2O$ | water | <2 |
| $CrCl_3 \cdot 6H_2O$ | ethanol | 0.2 |

As seen from Table 1, several synthetic combinations resulted in the formation of dark blue monolithic gels. Numerable solvents, as indicated in Table 1, are compatible with this method. Successful syntheses were achieved in most of the polar protic and polar aprotic solvents employed. In addition, the syntheses can be performed with either the nitrate or chloride Cr(III) salt Water was present in all of the successful syntheses shown in Table 1. It is believed that the presence of a significant amount of water is necessary for the formation of the $[Cr(H_2O)_6]^{3+}$ species that is the solution phase precursor to these materials. The water molecules on the $[Cr(H_2O)_6]^3$ species are relatively acidic due to charge transfer from them to the $Cr^{3+}$ metal center. It is postulated that the species is acidic enough to donate protons to the added propylene oxide (a well known proton scavenger used in many organic reactions). The protonated propylene oxide then undergoes an irreversible ring-opening reaction with the nucleophilic anion of the $Cr^{3+}$ salt (either chloride or nitrate ion in this application). The net effect is to raise the pH of the solution slowly and homogeneously. The result is the formation of aquo-hydroxy species of $Cr^3([Cr(OH)_x H_2O)_{6-x}]^{3+-x})$ These metal ion species are susceptible to the condensation reactions of olation and oxolation to yield oligomeric species (see Livage, et. al. *Prog. Inorg. Chem.*, 1988). The oligomers undergo further condensation to form a sol of chromia particles that further condense to form a gel. Gelling experiments in which the pH rise in aqueous syntheses of chromia gels (from ~1 before epoxide addition to ~6 just before gelation) was monitored have helped confirm this theory. In addition, this general gel mechanism has been validated using pH and NMR studies on the formation of $Fe_2O_3$ gels using this same method in Gash et al. *Chem. Mater.*, vol. 13, pg. 999 (2001). It is thus contended that the general mechanism of gel formation is the same for both metal ions.

If desired, the amount of epoxide can be reduced by using a base to pre-adjust the pH. For example, if gelation occurs at pH 6, a base such as sodium hydroxide or ammonium hydroxide could be used to bring the solution up to a pH just prior to 6, e.g., 5.5. Following this, a reduced amount of epoxide could be used to form the final gel.

Propylene oxide is a commercially available epoxide. Other commercially available epoxides such as 1,2-epoxybutane, 1,2-epoxypentane, 2,3-epoxy(proply)benzene, trimethylene oxide, 3,3-dimethyloxetane, glycidol, epichlorohydrin, and epibromohydrin can also be used to induce gelation in a manner similar to that shown for propylene oxide. The rate of gel formation depends on the identity and number of substituents on the epoxide ring.

The following two examples set forth specific step-by-step operations for carrying out the method in two different solvents.

GEL EXAMPLE 1

1. 0.65 g of $Cr(NO_3)_3 9H_2O$ was dissolved in 2.5 g of absolute ethanol
2. To that solution 1 g of propylene oxide was added and the solution stirred momentarily.
3. The stir bar was removed from the reaction vessel and the resulting dark blue solution was covered and allowed to set under ambient conditions until gelation occurred.
4. Under these conditions ([Cr(III)]=0.35 M; epoxide/Cr (III)=11; ethanol solvent) gelation occurred in approximately three hours

GEL EXAMPLE 2

1. 0.65 g of $Cr(NO_3)_3 9H_2O$ was dissolved in 2.5 g of 2-ethoxyethanol
2. To that solution 1 g of propylene oxide was added and the solution stirred momentarily.
3. The stir bar was removed from the reaction vessel and the resulting dark blue solution was covered and allowed to set under ambient conditions until gelation occurred.
4. Under these conditions ([Cr(III)]=0.35 M; epoxide/Cr (III)=11; ethanol solvent) gelation occurred in approximately two hours II. Processing of Chromia Gels:

The chromia gel was processed to form an aerogel monolith in a Polaron® supercritical point drier. The solvent liquid in the wet gel pores was exchanged for liquid $CO_2$ for several days at 13° C. and 800 psi. The temperature of the vessel was then ramped up to about 45° C., while maintaining a pressure of about 1400 psi. The vessel was then depressurized at a rate of about 7 bars per hour.

The following is a specific example of supercritical drying to produce an aerogel from the gel produced in Example 1 above.

EXAMPLE A (AEROGEL)

1. The wet gel from Gel Example 1, i.e., the sample, was placed in an ethanol bath and soaked for at least 24 hours.
2. After 24 hours the sample was removed from the bath and put into a coolant-jacketed Polaron® super critical point dryer, wherein the coolant temperature was about 13° C. The dryer was then closed and tightly sealed. Liquid $CO_2$ was introduced into the dryer and the pressure raised to about 800 psi as the dryer became filled with $CO_2$, which at this temperature and pressure remained a liquid. The fill level of the dryer can be monitored through a window.
3. The sample is kept in the dryer until the pore liquid has been exchanged with the liquid $CO_2$. Displaced solvent is drained from the bottom of the dryer. Once there appears to be no additional solvent collection at the drain of the dryer, it is assumed that the sample has been completely exchanged.
4. The temperature of the dryer is increased to about 45° C. by changing the temperature of the coolant. A rise in temperature causes the pressure to rise to a region (T>31° C.; p>1200 psi) where the $CO_2$ in the pore liquid becomes a supercritical fluid.
5. The dryer is then vented at a rate of about 50–100 psi per hour at a temperature of about 45° C. until the $CO_2$ has been all vented and the pressure in the dryer is now atmospheric.

Porous high-surface area chromia aerogels can be produced via the synthetic method disclosed herein in section I utilizing the rapid supercritical solvent extraction described in Coronado et al, U.S. Pat. No. 5,686,031, owned by the same assignee and hereby incorporated by reference.

Xerogels monoliths were processed by allowing a quantity of gel to dry under ambient conditions for various lengths of time, such as 7 days or 14 days. In some cases controlled drying environments and atmospheres were used (e.g., desiccators or drying under inert gases). These conditions are manipulated to control the rate of evaporation.

The following is a specific example of atmospheric drying to produce a xerogel from the chromia gel produced in Gel Example 1 above.

EXAMPLE B (XEROGEL)

The gel from Gel Example 1 was exposed to ambient conditions (room temperature and pressure) by opening the reaction vessel, i.e., a vial, and the remaining solvent allowed to evaporate for 14 days.

The atmospheric drying caused significant shrinkage of the monolith so it was easily removed from the vial by hand.

Characterization of Aerogels and Xerogels

Various aerogel and xerogel samples were characterized. Surface area pore size and pore volume were determined by analysis of portions of samples on a Micromeretics ASAP2000 Surface area Analyzer.

Samples of approximately 0.1–0.2 g were heated to 200° C. under vacuum (about $10^{-5}$ Torr) for at least 24 hours to remove all adsorbed species. Nitrogen adsorption data was taken at five relative pressures from 0.05 to 0.20 at 77K, to calculate the surface area by BET theory. The high resolution transmission electron microscopy (HRTEM) was performed on a Philips CM300FEG operating at 300 Kev using zero loss energy filtering with a Gatan energy Imaging Filter (GIF) to remove inelastic scattering. The images were taken under BF (bright field) conditions and slightly defocused to increase contrast. The images were also recorded on a 2K×2K CCD camera attached to the GIF.

In general, all of the materials have surface areas and pore diameters whose dimensions are in the mesoporic (2–20 nm) region. The surface areas of the chromia aerogels were in the range of about 300 $m^2/g$ to about 700 $m^2/g$. See A. E. Gash et al., "New Sol-Gel Synthetic Route to Transition and Main-Group Metal Oxide Aerogels Using Inorganic Salt Precursors." *J. Non-Cryst. Solids*, vol. 22, pg. 285 (2001).

Some of the gels from Table 1 were processed to aerogels and/or xerogels. The aerogel densities were highly reproducible and were found to depend on the solvent used for synthesis. Aerogels with densities from 80 mg/ml to 600 mg/ml and xerogels with densities 1100–1300 mg/ml were readily prepared. These gels are very robust and nicely structured monoliths. Acoustical methods were used to determine some of their mechanical properties. The integrity of the aerogel monoliths also allows them to be cast and used in complex geometric shapes, e.g., spheres, rectangles, right circular cylinders and any other shape for which a mold has been made.

Referring to FIG. 1, high-resolution transmission electron microscopy (HRTEM) was used to examine the nanostructure of the chromia aerogels, and a micrograph of a chromia aerogel was made. Qualitatively, the material appears to be a collection of clusters of particles that contain cavities of mesoporous dimensions. The scale of the micrograph is sufficient to provide a representation of the size, shape, and connectivity of the particles that make up the aerogel. From the micrograph, it appears that the aerogel is made up of relatively uniform spherical particles mostly having diameters in the range of about 5 nm to about 15 nm. The aerogel appears to made up entirely of these uniformly sized particles. The gel in the micrograph appeared amorphous as it did not diffract electrons under the electron microscope.

Table 2 is a summary of nitrogen adsorption/desorption analyses for some chromia aerogels. It summarizes the surface areas, pore volumes, and average pore sizes for these chromia aerogels.

TABLE 2

| Precursor Salt | Solvent | Surface Area ($m^2/g$) | Pore Vol. (ml/g) | Ave. Pore Dia.(nm) |
|---|---|---|---|---|
| $Cr(NO_3)_3.9H_2O$ | EtOH | 490 | 1.64 | 11 |
| $CrCl_3.6H_2O$ | EtOH | 420 | 2.20 | 18 |
| $Cr(Cl)_3.6H_2O$ | $H_2O$ | 520 | 1.90 | 11 |

In general, all of the materials listed in Table 2 have surface areas between about 420 $m^2/g$ and about 520 $m^2/g$ and pore diameters whose dimensions are in the mesoporic (2–20 nm) region. The surface areas of these materials are significantly higher than those reported for chromium(III) oxide gels prepared by precipitation with base and those for commercial chromia catalysts. The adsorption/desorption isotherms for the aerogel materials displayed the classic shape of a Type IV isotherm, that is indicative of a mesoporous material.

The HRTEM results indicate that chromia gels are particulate gels made up of particles with diameters on the order of about 5 nm. The particles that make up the gel appear to be uniform and not a mixture of crystalline phases. Gels having a mixture of crystalline phases were synthesized by precipitation from aqueous solution with base and have previously been reported by Saraswat et al, *J. Mater. Sci. Lett.*, vol. 3, pg. 515 (1984).

While various materials, parameters, operational sequences, etc. have been described to exemplify and teach the principles of this invention, such are not intended to be limited. Modifications and changes may become apparent to those skilled in the art; and it is intended that the invention be limited only by the scope of the appended claims.

We claim:

1. A sol-gel processing method for producing nanostructured chromium(III)-oxide-based materials comprising:
    forming a solution containing at least one hydrated-chromium(III) inorganic salt and at least one solvent, wherein said solution has a pH less than 7 and a gelation point;
    adjusting the pH of the solution with a first proton scavenger comprising a hydroxide base to a point just prior to the gelation point; and
    adding an organic epoxide to the solution to induce gel formation of the solution, wherein following said addition a nanostructured chromium(III)-oxide-based gel is formed.

2. The method of claim 1, wherein the solution contains water.

3. The method of claim 1, further comprising:
    drying said nanostructured chromium(III)-oxide-based gel by atmospheric evaporation to form a nanostructured monolith chromium(III)-oxide-based monolithic xerogel.

4. The method of claim 1, further comprising:
drying said nanostructured chromium(III)-oxide-based gel by super critical solvent extraction to form a nanostructured monolith chromium(III)-oxide-based to form a monolithic aerogel.

5. The method of claim 4, wherein said monolithic aerogel has a surface area greater than about 420 $m^2/g$.

6. The method of claim 1, wherein forming the solution is carried out using ethanol as the solvent.

7. The method of claim 1, wherein all steps are carried out under ambient conditions.

8. The method of claim 1, wherein forming the solution is carried out using a hydrated-chromium(III) inorganic salt selected from the group consisting of chromium(III) nitrate nonahydrate, chromium(III) chloride hexahydrate, chromium (III) bromide hexahydrate, chromium (III) fluoride tetrahydrate, and chromium (III) sulfate hydrate.

9. The method of claim 1, wherein forming the solution is carried out using a solvent selected from the group of water, ethanol, methanol, 1-propanol, isopropanol, tert-butanol, 2-butanol, 2-ethoxyethanol, dimethylformamide, ethylene glycol, and dimethylsulfoxide.

10. The method of claim 1, wherein the organic epoxide is propylene oxide, 1,2-epoxybutane, 1,2-epoxypentane, epichlorohydrin, epibromohydrin, epichlorohydrin, butadiene monoxide, glycidol, trimethylene oxide, 3,3-dimethyoxetane, 2,3 epoxy(propyl) benzene, cyclohexene oxide, or cis-2,3-epoxybutane.

11. The method of claim 1, wherein forming the solution is carried out using between about a 0.03–0.06M solution in 200 proof ethanol, wherein the total proton scavenger equals the amount of proton scavenger added plus the amount of organic epoxide added and the quantity of total proton scavenger added is determined by using a molar ratio of total proton scavenger to Cr(III) of 6 or greater.

12. A sol-gel processing method for producing nanostructured chromium(III)-oxide-based materials comprising:
forming a solution containing at least one anhydrous chromium(III) inorganic salt and at least one solvent;
adding at least 3 equivalents of water to said solution causing said solution to have a pH less than 7 and a gelation point;
adjusting the pH of the solution with a first proton scavenger comprising a hydroxide base to a point just prior to the gelation point; and
adding an organic epoxide to the solution to induce gel formation of the solution, wherein following said addition a nanostructured chromium(III)-oxide-based gel is formed.

13. The method of claim 12, wherein said second base is an epoxide, further comprising:
drying said nanostructured chromium(III)-oxide-based gel by atmospheric evaporation to form a nanostructured monolith chromium(III)-oxide-based monolithic xerogel.

14. The method of claim 12, wherein said second base is an epoxide, further comprising:
drying said nanostructured chromium(III)-oxide-based gel by super critical solvent extraction to form a nanostructured monolith chromium(III)-oxide-based to form a monolithic aerogel.

15. The method of claim 13, wherein said monolithic aerogel has a surface area greater than about 420 $m^2/g$.

16. The method of claim 12, wherein forming the solution is carried out using ethanol as the solvent.

17. The method of claim 12, wherein all steps are carried out under ambient conditions.

18. The method of claim 12, wherein the organic epoxide is propylene oxide, 1,2-epoxybutane, 1,2-epoxypentane, epichlorohydrin, epibromohydrin, epichlorohydrin, butadiene monoxide, glycidol, trimethylene oxide, 3,3-dimethyoxetane, 2,3 epoxy(propyl) benzene, cyclohexene oxide, or cis-2,3-epoxybutane.

19. The method of claim 12, wherein forming the solution is carried out using between about a 0.03–0.06M solution in 200 proof ethanol, wherein the total proton scavenger equals the amount of proton scavenger added plus the amount of organic epoxide added and the quantity of total proton scavenger added is determined by using a molar ratio of total proton scavenger to Cr(III) of 6 or greater.

* * * * *